United States Patent [19]

Ferrell

[11] Patent Number: 4,612,722

[45] Date of Patent: Sep. 23, 1986

[54] RANDOM MOVEMENT, MOTORIZED WATER FOWL DECOY

[76] Inventor: Mike C. Ferrell, 11122 Henge Dr., Austin, Tex. 78759

[21] Appl. No.: 646,695

[22] Filed: Aug. 31, 1984

[51] Int. Cl.⁴ ............................................ A01M 31/06
[52] U.S. Cl. .......................................... 43/3; 43/26.1
[58] Field of Search ...................... 43/2, 3, 17.5, 21.1, 43/21.2, 26.1; 446/155, 156, 160

[56] References Cited

U.S. PATENT DOCUMENTS

| | | | |
|---|---|---|---|
| 833,511 | 10/1906 | Dean | 446/160 |
| 1,185,559 | 5/1916 | Vaughan | 43/3 |
| 1,639,707 | 8/1927 | Shaver | 446/160 |
| 2,460,128 | 1/1949 | Greenleaf | 43/3 |
| 2,726,471 | 12/1955 | Uus | 43/17.5 |
| 2,799,960 | 7/1957 | Riley | 43/3 |
| 2,814,146 | 11/1957 | Propp | 43/3 |
| 2,835,064 | 5/1958 | Webb | 43/3 |
| 3,000,128 | 9/1961 | McAda | 43/3 |
| 3,074,195 | 1/1963 | Vanderpool | 43/3 |
| 3,689,927 | 9/1972 | Boston | 43/3 |
| 4,056,890 | 11/1977 | Dembski . | |
| 4,322,908 | 4/1982 | McCrory | 43/3 |

Primary Examiner—M. Jordan

[57] ABSTRACT

A water fowl decoy comprised of a head, body, and a propulsion means in the body. The decoy body bottom has a keel and a rudder attached to the keel. The rudder length does not exceed 30% of the overall length of the decoy and the rudders height being approximately equal to its length and having a convex curvature. The rudder is located below the center of gravity of the decoy. The decoy has a tether line and weight for allowing the decoy to produce a random motion when the propeller is activated.

4 Claims, 6 Drawing Figures

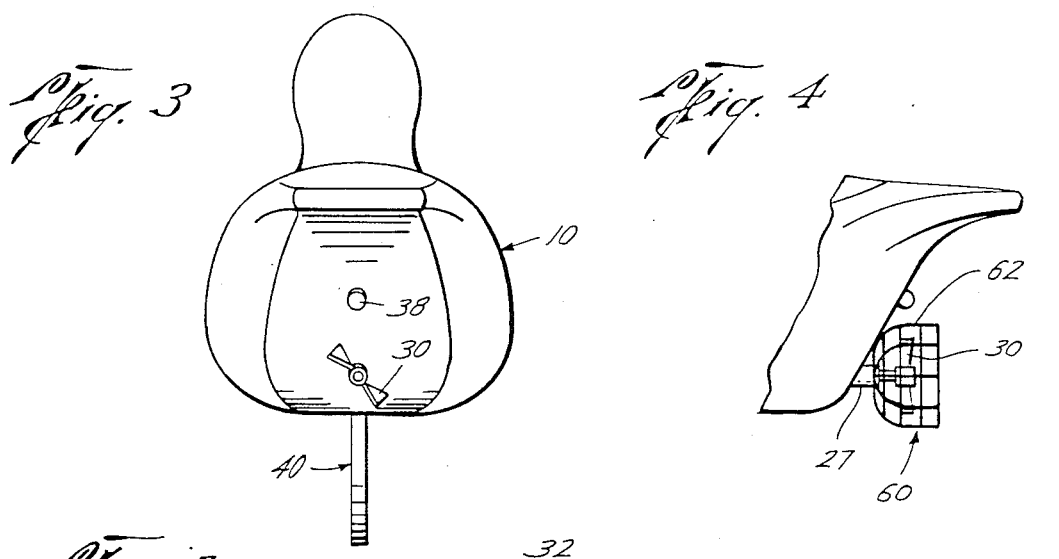
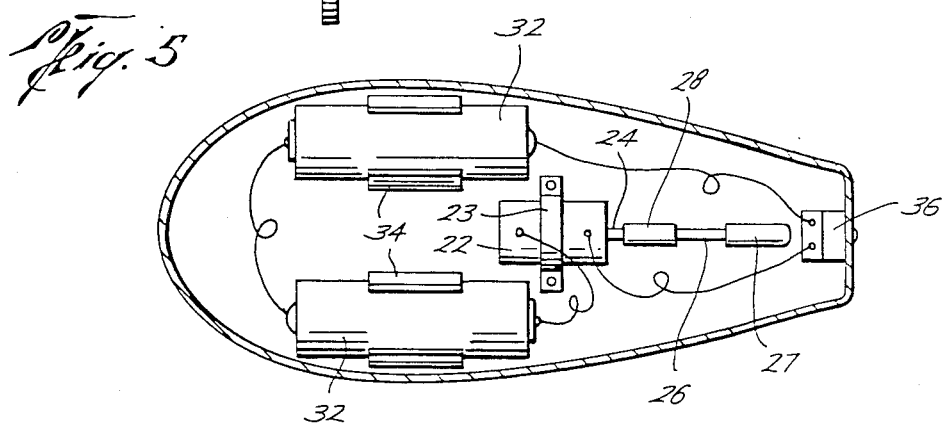
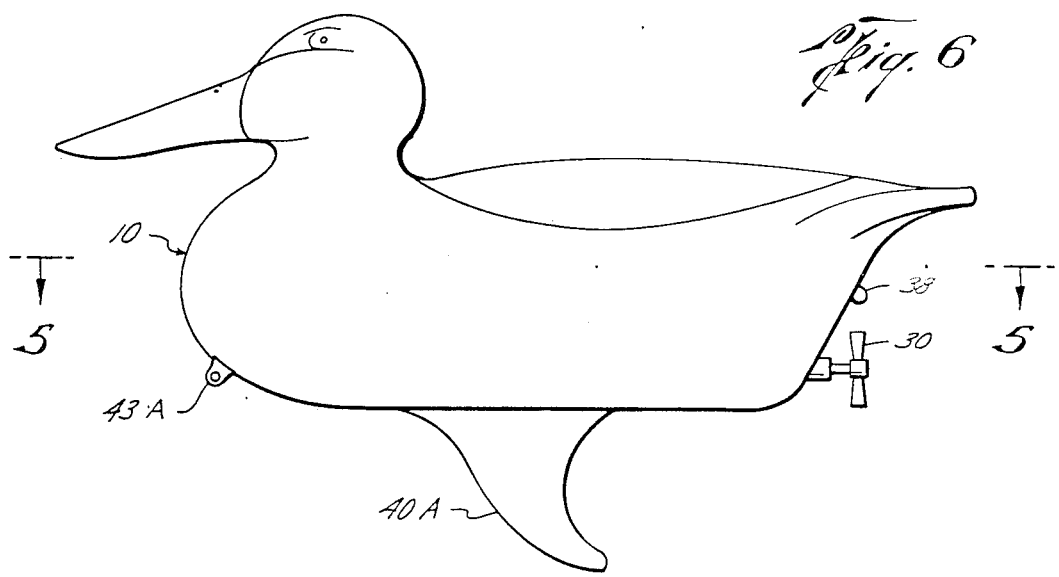

RANDOM MOVEMENT, MOTORIZED WATER FOWL DECOY

BACKGROUND OF THE INVENTION

The present invention relates to decoys for use in hunting, and more specifically, it relates to water fowl decoys.

For many years, water fowl hunters have used decoys to lure water fowl to a pond or other body of water. Great efforts have been exerted to make the decoys closely simulate the appearance and size of actual birds. As a result, there are available today decoys for almost any water fowl which look almost identical to the real water fowl.

While such decoys have a life like appearance, it is also desirable to make the decoy move in the water such that it simulates the swimming motion of a duck. Many attempts have also been made to so motivate a decoy. It is believed, however, that the resulting decoys either are designed such that they will exhibit fixed or regular swimming motion, unlike the actual motion of a duck. Alternatively, the decoys appear to be so complex that the cost of manufacturing the respective decoy would make it more expensive than the average hunter would care to spend for the added realism.

Among patents which disclose decoys which appear, from their disclosures, to exhibit motion in a somewhat fixed or predetermined direction is U.S. Pat. No. 4,322,908 to McCroy. McCroy discloses an animated water fowl decoy with self-contained power and control systems. The decoy includes a torque converter capstan which, when rotating, pulls itself along a tether string, causing the decoy to traverse the tether string. The tether string is secured at each end such that it provides a stationary track upon the water along which the decoy moves to and fro. Hence, the decoy disclosed in McCroy appears to be designed to move back and forth along a tether string, a movement which lacks the random directional changes characteristic of most actual water fowl.

An example of a decoy which, while being able to exhibit random directional motion, also appears to be fairly complex and expensive to manufacture is the decoy disclosed in U.S. Pat. No. 3,689,927 to Boston. This patent discloses a water fowl decoy which Boston states contains a radio receiver adapted to receive signals from a remote radio transmitter. The receiver connects to an amplifier, one or more servos and other components within the decoy. A rudder operable by a servo steers the decoy. An electric motor drives a propeller to motivate the decoy. It is believed that the inclusion of such electronics and mechanical linkages would greatly increase the cost of manufacturing this decoy to the extent that for the average hunter, the decoy would be cost prohibitive.

Another example of a disclosure of a decoy that appears to be somewhat complex is U.S. Pat. No. 2,835,064 to Webb. This patent appears to disclose a decoy which is adapted to cause the head of the decoy to swing back and forth, to cause a duck sound to be emitted at intervals, and to cause the duck to alter its course intermittently in opposite directions owing to the swinging of a rudder.

Other attempts at motorized water fowl decoys include those disclosed in U.S. Pat. Nos. 2,460,128 to Greenleaf; 2,799,960 to Riley; 2,814,146 to Propp; 3,000,128 to McAda; and 4,056,890 to Dembski.

While the decoys disclosed in the above-referenced patents are believed to be useful for many purposes, they appear to lack the simplicity necessary to minimize the cost of production, while at the same time including features which will cause the resulting decoy to exhibit random directional behavior similar to that of most water fowl. Accordingly, to provide an improved water fowl decoy, it is desirable to provide a decoy which is both very simple in construction and which is capable of exhibiting random directional movement in the water.

SUMMARY OF THE INVENTION

The present invention overcomes the prior art disadvantages through a water fowl decoy which includes a decoy body having a front end, a rear end and a bottom, the bottom corresponding to a side of the decoy which is in the water when the decoy is used. A propulsion means is mounted to the decoy body for propelling the decoy body in the water and is adapted to propel the decoy body such that the front end is the leading end during propelled movement of the decoy body. The decoy body and propulsion means are relatively disposed to have a center of gravity of known approximate location between the front end and the rear end. A keel is mounted to the bottom of the decoy body and is preferably positioned approximately beneath the center of gravity. The keel is preferably aligned with a line running from the front end to the rear end of the decoy body which is in substantial alignment with the direction of propulsion of the propulsion means and is shaped such that the keel keeps the decoy moving in a substantially straight line when forward movement of the decoy is substantially unimpeded. The keel is further shaped such that when the decoy is attached to a fixed tether having a selected amount of slack and reaches the end of the slack of the tether, the keel provides minimum water resistance to the turning of the front end and the rear end to accommodate the pivoting of the decoy body about the keel and the center of gravity of the decoy body and such that once the decoy has pivoted, the keel stabilizes the movement of the decoy on a new line of motion. That is, the keel is adapted to act as an axis about which the decoy body may rotate and to direct the decoy body in a new line of motion once it has rotated.

In a preferred embodiment of the present invention, the decoy further includes a tether line which is securable at one end to the decoy body proximate the front end of the body and in front of the center of gravity. The decoy further includes an anchor detachably securable to an opposing end of the tether line such that the tether line and anchor are adapted to detachably anchor the decoy to a floor of a body of water with a selected amount of slack in the tether line when the tether line is attached to the decoy body in use.

In a more preferred embodiment, the propulsion means of the decoy may include a means for selectively controlling the speed of propulsion.

It has been found that a decoy having a keel positioned as described above, when secured to a tether with a predetermined amount of slack, will swim out the full amount of the slack, at which time the anchored tether will force the front of the decoy to rotate. The amount of rotation will vary, but typically the decoy will rotate more than 90°. The keel then aligns the movement of the decoy along the new direction created by the pivot, causing the decoy to proceed in another direction until the end of the slack is again reached. This behavior is repeated throughout the operation of the decoy.

Because the provision of the keel and the tether hookup produces the random movement of the decoy, it is not necessary to include steering linkages, rear rudders, or similar features that tend to make the prior art devices more complicated. Rather, only a simple propulsion means for propelling the water fowl decoy is needed.

Additionally, the means for selectively controlling the speed of propulsion accommodates the adjustment of the speed of the decoy to account for forces from water currents and wind currents. That is the speed of the decoy may be set low enough such that the force of the water and wind will effect the direction of travel of the decoy to add to the randomness of the movement of the decoy. Alternatively, the speed may be set high enough such that the decoy will be propelled in straight lines disposed at random angles to each other because of the turning of the decoy by the end of the tether as described above.

In a preferred embodiment of the present invention, the propulsion means includes a motor comprising a drive shaft and a propeller operatively connected to the drive shaft such that the propeller extends from a point proximate the rear end of the duck to drive the front end of the duck forward. In a more preferred aspect of this embodiment, a motor speed control device may be included for selectively varying the speed of the motor to control the speed of the decoy thereby.

In a preferred aspect of this embodiment, the motor comprises a variable speed electric motor, preferably a direct current motor wherein the speed varies in relation to the voltage supplied to it. The motor speed control means comprises a means for selectively controlling the voltage supply to the motor. The motor speed control means may preferably include a variable resistor connected in series between a power source and the electric motor when the electric motor is a direct current motor.

In a preferred embodiment of the keel of the present invention, the keel extends substantially from the front end of the decoy body to a location substantially beneath the center of gravity of the decoy body. The keel includes a front attachment section positioned at the front end of the decoy body wherein the front attachment section is shaped to receive a tether for detachable securement thereto. The front attachment section is also shaped to minimize water resistance to turning of the front end of the decoy. The keel further includes a rudder section preferably positioned approximately beneath the center of gravity of the decoy body and propulsion system. The rudder section has a rudder-like shape aligned in the direction of forward motion of the decoy when not turning. The rudder section is adapted to provide water resistance to turning such that the rudder forms a pivot point for the decoy in the water and such that the rudder section stabilizes the decoy once the initial impetus of a turn is completed.

In the most preferred embodiment of the present invention, the decoy body is hollow and the propulsion means is mounted within the decoy body.

While an important feature of the present invention is the provision of the keel beneath the center of gravity of the duck to help promote the random movement of the water fowl decoy in use, another important feature of the present invention is the provision of a propulsion means together with a means for selectively controlling the speed of propulsion. In addition to the advantage discussed above, such an arrangement also allows the use of expendable power sources such as batteries and the adjustment of the speed of propulsion as the power sources diminish. Accordingly, when new batteries are placed into a decoy, the speed of the decoy may be controlled to be life-like.

Accordingly, the present invention overcomes the previously discussed problems of the prior art through a decoy having a minimum number of moving parts which is simple to manufacture and simple in design. At the same time, the decoy is capable of exhibiting random directional movement, thereby more closely simulating the actual movement of water fowl.

BRIEF DESCRIPTION OF THE DRAWINGS

This invention will be further illustrated by reference to the appended drawings which illustrate a particular embodiment of the water fowl decoy of the present invention.

FIG. 3 is a rear view of the decoy shown in FIG. 1.

FIG. 4 is a side view of the propeller shown in FIG. 1 wherein there is further illustrated a mesh basket protective shield in accordance with the present invention.

FIG. 5 is a top, partial sectional view taken along line 5—5 of the decoy of FIG. 6, illustrating an alternative embodiment of the decoy of FIG. 6 having an alternative placement of the propulsion system.

FIG. 6 illustrates an alternative embodiment of the decoy of FIG. 1 having an alternative keel shape and point of attachment of the tether.

DESCRIPTION OF THE PREFERRED EMBODIMENT

Figure 1:
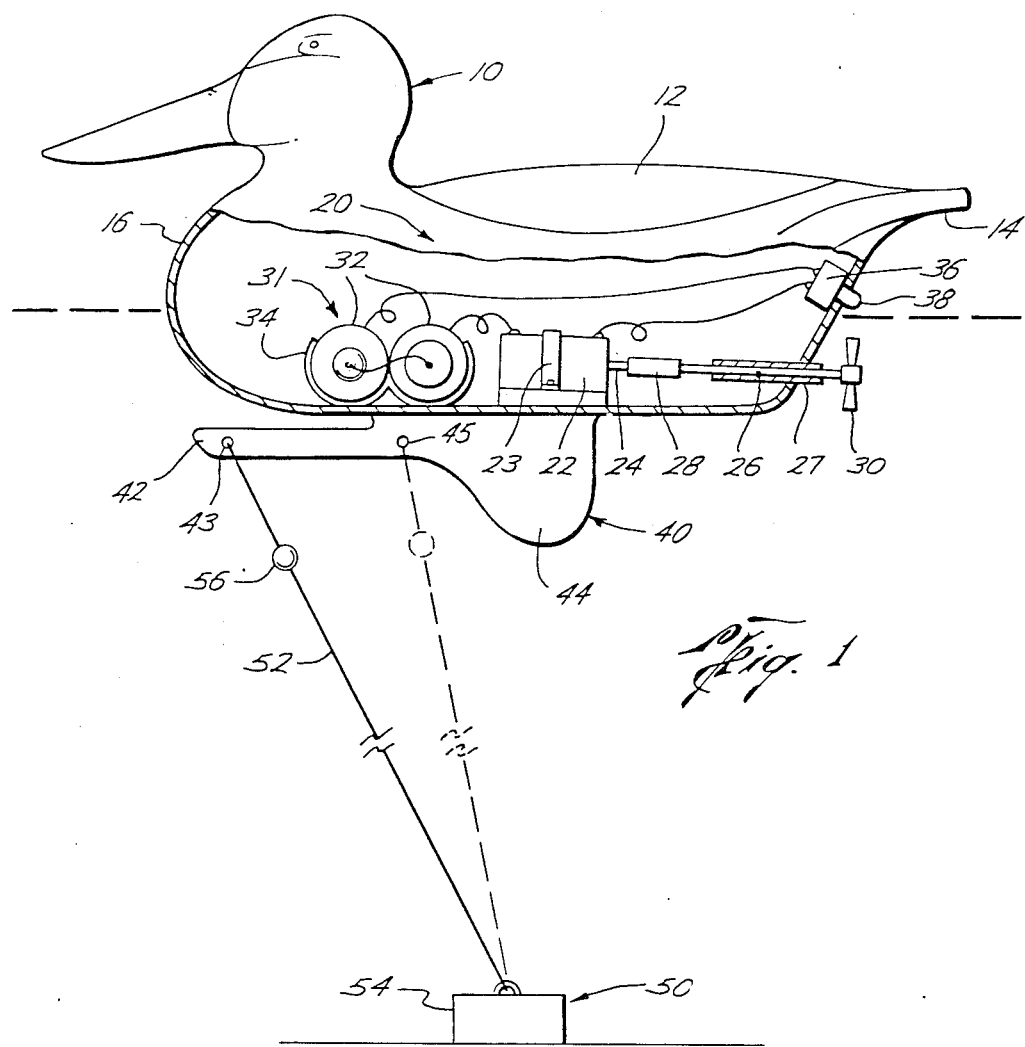
FIG. 1 is a partial sectional side view of a water fowl decoy constructed in accordance with the present invention.
Figure 2:
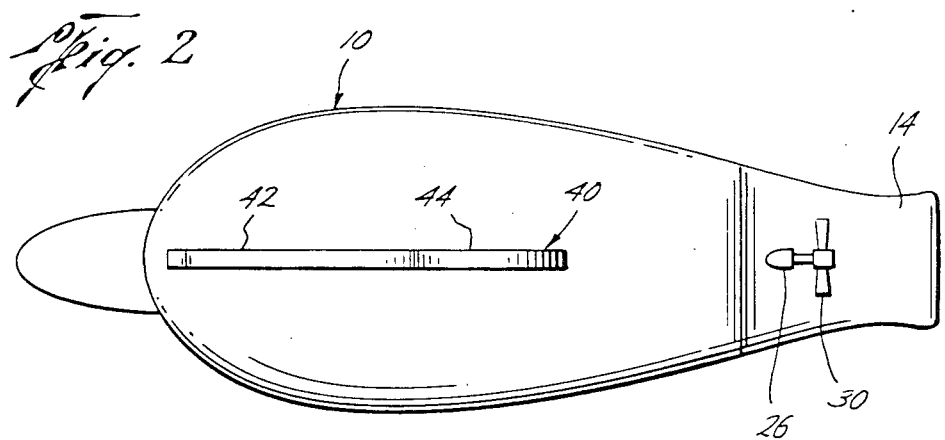
FIG. 2 is a bottom view of the decoy shown in FIG. 1.

The preferred embodiment is generally represented by a decoy having 2 body 10, a propulsion means 20 for propelling the decoy body 10, a keel 40 mounted to the decoy body 10 and an anchor system 50.

The decoy body 10 is adapted to provide support for the propulsion means 20 and the keel 40. The decoy body 10 may be shaped in the shape of any of a number of water fowls, including any of the various types of ducks or geese. The decoy body 10 is adapted to be buoyant such that the body 10 may be placed in the water in use. In the preferred embodiment, the decoy body 10 comprises a hollow member formed in the shape of a water fowl. The body 10 includes a detachable lid 12 for installation of the propulsion system 20 within the body 10 as shown in FIG. 1. It should be understood, however, that the body 10 could be solid, or could be completely closed, whereby the propulsion system 20 would be mounted to the exterior of the body 10.

Referring still to FIG. 1, the propulsion system 20 is adapted to exert rearward force to move the decoy body 10 forward. The propulsion system 20 may include a motor 22 having suitable output characteristics for rotating a propeller 30 in the water. More specifically, the propulsion system 20 may be designed such that the rotation of a propeller 30 within the water by the system 20 motivates the decoy body 10 at a preselected speed.

In the preferred embodiment, the propulsion system 20 includes a three volt direct current motor 22 having a driveshaft 24 extending therefrom. The driveshaft 24 is connected to a propeller shaft 26 by means of a flexible connecting sleeve 28 such that the driveshaft 24 and the propeller shaft 26 form a direct connection. A propeller 30 is secured to the propeller shaft 26 to rotate upon rotation of the driveshaft 24. The size and pitch of the propeller 30 are selected to complement the speed of rotation of the shaft 26 to provide a desired amount of propulsion.

The propulsion system 20 of the preferred embodiment further includes a power source. For propulsion systems including electric motors, the power source will typically comprise one or more batteries adapted to supply a predetermined maximum voltage. In the preferred embodiment, the power source includes a pair of D-cell batteries 32 which are mounted within the decoy body 10 by means of a battery frame 34. The battery frame 34 is selectively positioned to yield a desired location for the center of gravity of the decoy body-propulsion system combination. In the preferred embodiment, the battery frame 34 is positioned substantially along the longitudinal centerline of the decoy body 10 and centered such that the center of gravity of the decoy body 10 will fall on or above a point along the longitudinal centerline. Alternatively, for those instances wherein greater space is needed for the motor 22 and shaft 26, the battery frame 34 may be split such that the batteries 32 are symetrically disposed about the longitudinal centerline as shown in FIG. 5 to yield substantially the same effect.

The propulsion system 20 may also include a means for controlling the speed of propulsion. In the preferred embodiment, the speed control means comprises a variable resistor 36 connected in series with the power source 31 such that the variable resistor 36 may be varied to control the voltage to the motor 22. In turn, the motor 22 is adapted to respond to such changes in voltage with corresponding changes in speed of rotation of the driveshaft 24. As shown in FIG. 1, adjustment of the variable resistor 36 may be provided by a knob 38 adapted such that rotation of the knob 38 changes the resistance of the variable resistor 36 in a manner common to many variable resistors currently available.

Referring still to FIG. 1, in the preferred embodiment, the propulsion system 20 is mounted within the decoy body 10. More specifically, the motor 22 is mounted to the interior base of the decoy 10 by a motor stand 23 such that the drive shaft 24 of the motor 22 extends toward the rear end 14 of the decoy body 10. The motor 22 is positioned within the motor stand 23 such that the drive shaft 24 further is slightly inclined, in the preferred embodiment, below horizontal at an angle of approximately 15°. In turn, the propeller shaft 26 is mounted in a propeller shaft sleeve 27 which extends through the wall of the decoy body 10 to allow the propeller shaft to exit the decoy body 10. The propeller shaft 26 is inclined at substantially the same angle as the shaft 24 and positioned such that the shaft 26 substantially aligns with the drive shaft 24 to place minimum stress on the flexible connecting sleeve 28.

The propeller shaft 26 extends out of the decoy body 10 downwardly a sufficient distance such that the propeller 30 attached to the propeller shaft 26 resides in the water in use a suitable distance to effect propulsion of the decoy body 10. Accordingly, the motor-propeller arrangment of the present invention is adapted to provide a direct connection between the motor 22 and the propeller 30 such that the number of moving parts are minimized, and such that wear on the motor 22 is also minimized.

In the preferred embodiment, the shaft 26 and propeller 30 are angled downwardly to minimize water surface turbulence. It will be understood, however, that the shaft 26 may be mounted horizontally as shown in FIGS. 4 and 6.

In the preferred embodiment, a direct current motor 22 and a direct linkage with the propeller 30 are utilized to minimize cost and complexity. It will be understood, however, that other motors such as other electric motors or pneumatic motors using other types of power sources may also be utilized in the present invention. Also, linkages other than a direct linkage, such as geared linkages, may be utilized in accordance with the present invention.

Also, in the preferred embodiment, a variable resistor 36 is utilized to control the voltage to the motor 22 in order to control the speed of the motor 22. It will be understood, however, that numerous other means of controlling voltage and/or current to a direct current motor 22 may be utilized in order to control the speed of the motor 22. Similarly, for other types of motors, such as pneumatic motors or alternating current electric motors, there exist numerous other devices which may be utilized to control the speed of such motors in accordance with the present invention. Additionally, the speed of propulsion may be controlled through a suitable gear assembly for those motors having a speed of rotation outside of an acceptable range.

Referring again to FIG. 1, the keel 40 of the present invention is mounted to the decoy body 10 such that the keel 40 is underwater when the decoy body 10 is in the water in use. In the preferred embodiment, the keel is positioned approximately beneath the center of gravity (or the center of weight) of the combination of the decoy body 10 and propulsion system 20. It is considered that the determination of the location of the center of gravity of a mass such as a decoy body 10 is a matter of design known to those of skill in the art. The keel 40 is shaped such that it provides minimum water resistance to the turning of the front end 16 and the rear end 14 while providing water resistance beneath the center of gravity such that the keel 40 forms a pivot point or axis for the decoy body 10 to revolve around when the body 10 is forced to turn by a tether line 52 or other restricting device and such that the keel 40 stabilizes the decoy body 10 to tend to move in a straight line once the pivoting of the body 10 is completed.

In the preferred embodiment, the keel 40 includes a first attachment section 42 having a vertical width sufficient to accommodate the attachment of a tether 52 or other line through an aperture 43 or apertures disposed in the attachment section 42. More specifically, the width of the attachment section 42 is minimized such that the water resistance of the attachment section 42 to the turning of the front end 16 of the decoy body 10 is likewise minimized. The keel 40 further includes a rudder section 44 disposed substantially beneath the center of gravity of the combination of the decoy body 10 and propulsion system 20 and having a length not exceeding 30% of the overall length of the decoy and the height of the rudder being approximately equal to its length. The rudder section 44 extends downwardly into the water from the decoy body 10 and has a substantially constant thickness such that the rudder section 44 forms a stabilizing blade against lateral movement of the decoy body 10.

In the preferred embodiment, the attachment section 42 includes an aperture 43 positioned well in front of the center of gravity of the combination of the decoy body 10 and the propulsion system 20. It has been found that the attachment of a tether 52 to such a point well in front of the center of gravity increases the moment arm of the force of the tether 52 exerted when slack in the tether 52 is expended, thereby accentuating the pivotal torque placed on the decoy body 10. The decoy body 10, in turn, typically pivots more than 90° before commencing a new direction of travel. This minimizes the probability that the decoy body 10 will make a 90° turn and begin to travel in a circle with the tether fully extended.

The attachment section 42 may also include an aperture 45 positioned proximate the center of gravity. It has been found that the attachment of a tether 52 (shown ghosted) to such an aperture 45 will ultimately result in circular motion by the decoy body 10.

In the preferred embodiment, the keel 40 includes a tether attachment section 42. It has been found however, that the attachment section 42 may be eliminated and that the tether 52 may be attached directly to the decoy body 10 by an eyelet 43A or other suitable attachment means located in front of the center of gravity of the decoy body-propulsion system combination such as is shown in FIG. 6. Also, the shape of the keel 40 may be varied to increase or decrease the direction stabilizing influence exerted by the keel 40. Referring still to FIG. 6, there is shown an alternative keel 40A which is adapted to allow greater deviation in the movement of the decoy body 10 from a straight line path in response to wind and water current forces.

Referring still to FIG. 1, the tether system 50 may include any of a number of suitable tether lines 52 which are adapted to be detachably secured between an anchor 54 and the front end 16 of the decoy body 10, either to the attachment section 42 of the keel 40 or to the decoy body 10 itself, such that a suitable amount of slack is provided in the tether 52 to allow a selected radius of movement of the decoy body 10 in use. In the preferred embodiment, the tether 52 is comprised of monofilament line so that the tether 52 provides minimum water resistance during movement of the decoy 10. The tether system 50 may further include a weight 56 attached to the tether 52 a selected distance beneath the decoy body 10 such that the weight 56 keeps the tether 52 tight to preclude the tangling of the tether 52 in the keel 40 or propeller 30 in use. The weight 56 also acts to keep the tether 52 aligned with the keel 40 such that the position of tether 52 does not repeatedly favor a right or left turn in use. The weight 56 thereby enhances the random behavior of decoy body 10 when turning under the influence of a tether 52.

The anchor 54 of the tether system 50 may comprise any of a number of suitable weights or securing means adapted to be detachably secured to the floor of a body of water in use.

The decoy of the present invention may also include a shield adapted to protect the propeller 30 in use. Referring to FIG. 4, there is shown a protective shield 60 in accordance with the present invention. The shield 60 comprises a mesh basket 62 secured to the sleeve 27 between the decoy body 10 and the propeller 30. The basket 62 is shaped to extend rearwardly to enclose the propeller 30 so that the propeller 30 is protected from debris drawn toward it by its rotation in the water. The basket 62 may be open on the side to which the propeller 30 propels water such that the basket 62 does not inhibit the propulsion of the decoy body 10.

Accordingly, when the water fowl decoy of the present invention is utilized, the anchor 54 is deposited into the body of water with a suitable length of tether 52 attached thereto. The opposing end of the tether 52 is attached to the decoy body 10 either by attaching it to the aperture 43 of the attachment section 42 of the keel 40, if the keel of the particular embodiment includes an attachment section 42, or to a suitable eyelet 43A (as shown in FIG. 6) located at the front end 16 of the decoy body 10. The length of the tether 52 is selected such that a desired amount of slack is present in the tether 52 when the weight 54 is resting on the bottom of the body of water in order to accommodate movement of the decoy body 10 within a given radius.

The motor 22 of the decoy body 10 is then switched on and the variable resistor 36 is adjusted to provide the desired speed of propulsion for the decoy body 10.

Once the decoy body 10 is placed in the water, the decoy body 10 will proceed forward until the full length of the tether 52 is reached. Upon reaching the end of the tether 52, the decoy body 10 will pivot around the keel 40 due to the force exerted by the tether 52. The amount of pivot will be dependent upon the speed at which the decoy body 10 reaches the end of the the tether 52 and the angle at which the decoy body 10 is proceeding from the anchor 54. It has been found, however, that the amount of pivot of the decoy body 10 is usually sufficient to keep the decoy body 10 from tending toward a circular path around the anchor 54 when the attachment of the tether 52 is well in front of the center of gravity. Once the initial pivot is completed, the keel 40 stabilizes the decoy body 10 in the new direction presented by the pivot of the decoy body 10. The decoy thereby will continue to swim in random directions effected by the tether throughout the hunting session.

It should be noted that the random behavior of the decoy will be dependent, in part, on the speed of the decoy and on the wind and water current forces exerted on the decoy. It has been found that when the speed of the decoy is sufficiently low, such forces tend to greatly enhance the random behavior of the decoy by constantly changing the direction of the decoy. Yet, when the decoy reaches the end of the tether, it will still pivot a desired amount. Hence, the optimum speed for the decoy is a speed great enough to propel the decoy against such forces, while still allowing such forces to affect the direction of movement.

As stated earlier, the present invention provides the advantage of being able to adjust the speed. This allows the user to adjust the speed to the optimum speed described above and allows the user to account for the diminishing of the power available from finite power supplies such as batteries. More particularly, once the batteries 32 start to weaken, and the decoy body 10 starts to slow, the variable resistor 36 may be adjusted to lessen the resistance and thereby increase the voltage available to the motor 22. The speed of the decoy body 10 may therefore be maintained at a substantially constant level throughout use.

The present invention has been disclosed in connection with a preferred embodiment. It will be apparent to those of skill in the art, however, that variations from the illustrated embodiment may be undertaken without departing from the spirit and scope of the invention. For example, the propulsion system 20 could be mounted on the underside of the decoy body 10 in a waterproof casing and formed integrally with the keel 40. This and other variations will be apparent to those of skill in the art and are within the spirit and scope of the present invention.

What is claimed is:

1. A water fowl decoy comprised of a head and a body, said body having a propulsion means located therein for propelling the decoy in the water and said body having a planar bottom with a keel attached thereto, said keel having a rudder portion having a length not exceeding 30% of the overall length of the decoy and the height of the rudder portion being approximately equal to its length, said rudder portion having a convex curvature with respect to the plane of the bottom of the body, said rudder portion being directly below the center of gravity of said head, body, and propulsion means said keel having an attachment section with a tether line and weight attached thereto wherein when the propulsion means is activated the tether line which is connected to the decoy cause said decoy to follow a random path around the weight.

2. A decoy as in claim 1 wherein said propulsion means mounted in the decoy body to propel the decoy body in the water such that the front end is the leading end during propelled movement of the decoy body, the decoy body and propulsion means having a center of gravity of known approximate location between the front end and the rear end.

3. A decoy as in claim 2, wherein the propulsion means include:

A direct current electric motor comprising
(A) a drive shaft;
(B) a propeller operatively corrected to the driveshaft such that the propeller extends from a point proximate to the rear end of the decoy and such that movement of the driveshaft drives the propeller to propel the decoy; and
(C) propeller speed control means for selectively varying the speed of the propeller.

4. A decoy as in claim 3, in which said electric motor comprises a direct current electric motor and in which the voltage control means comprises a variable resistor connected between a power supply and the electric motor such that variation of the resistance causes a variation of the voltage to the motor.

* * * * *